June 23, 1953     A. BOSCHI     2,643,153
RESILIENT WHEEL
Filed Feb. 17, 1948     3 Sheets-Sheet 1
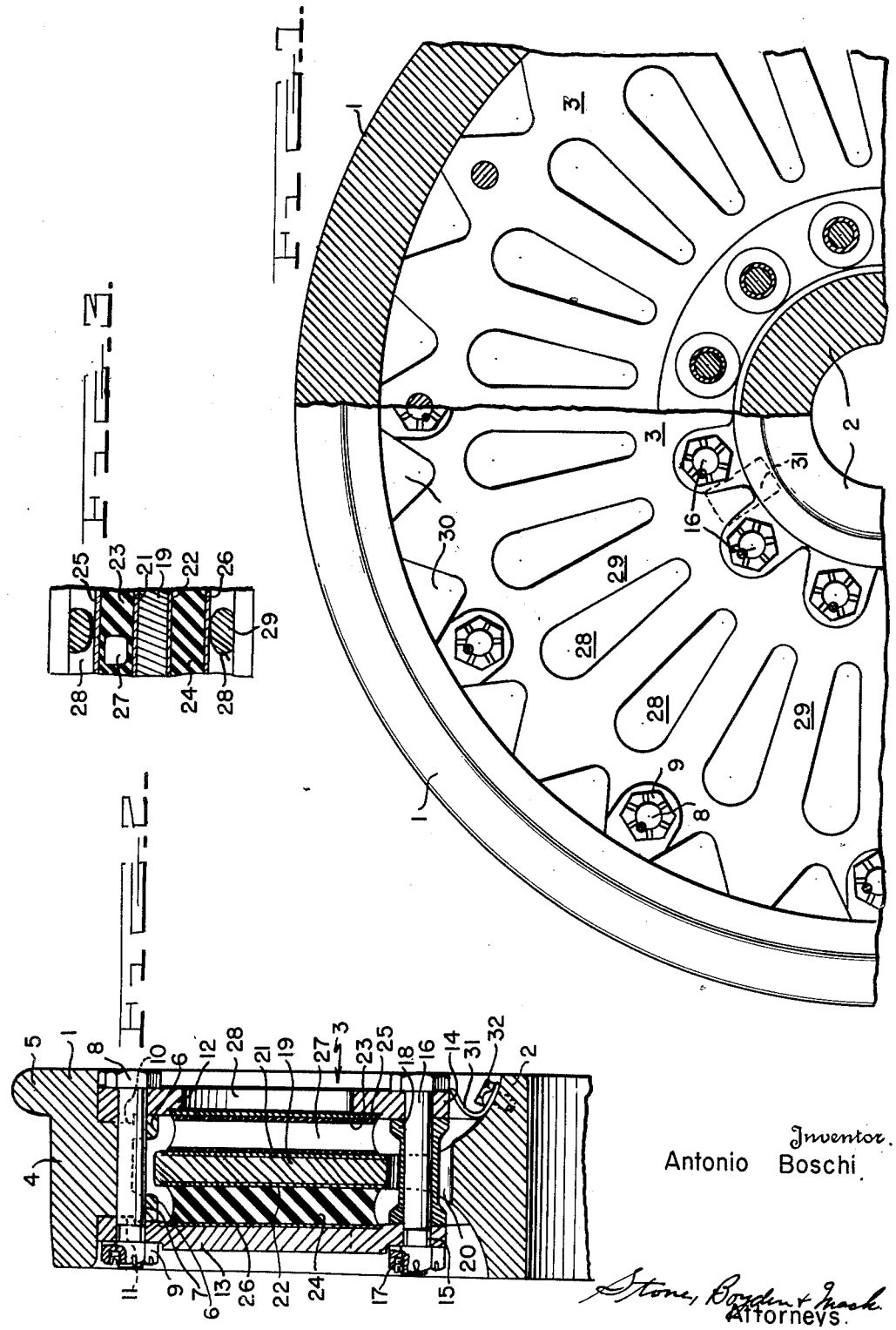
Inventor.
Antonio Boschi
Stone, Boyden & Mack
Attorneys.

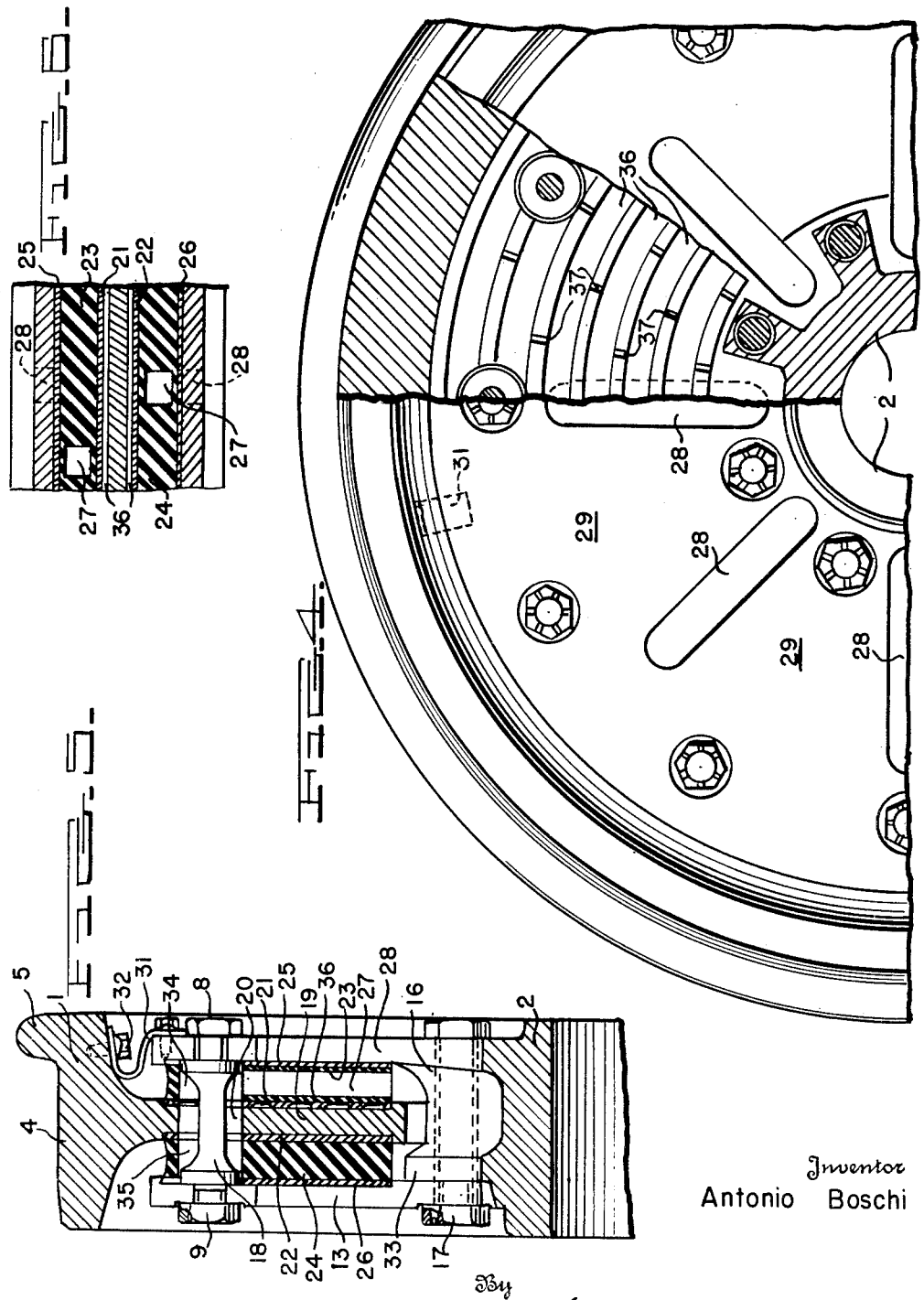

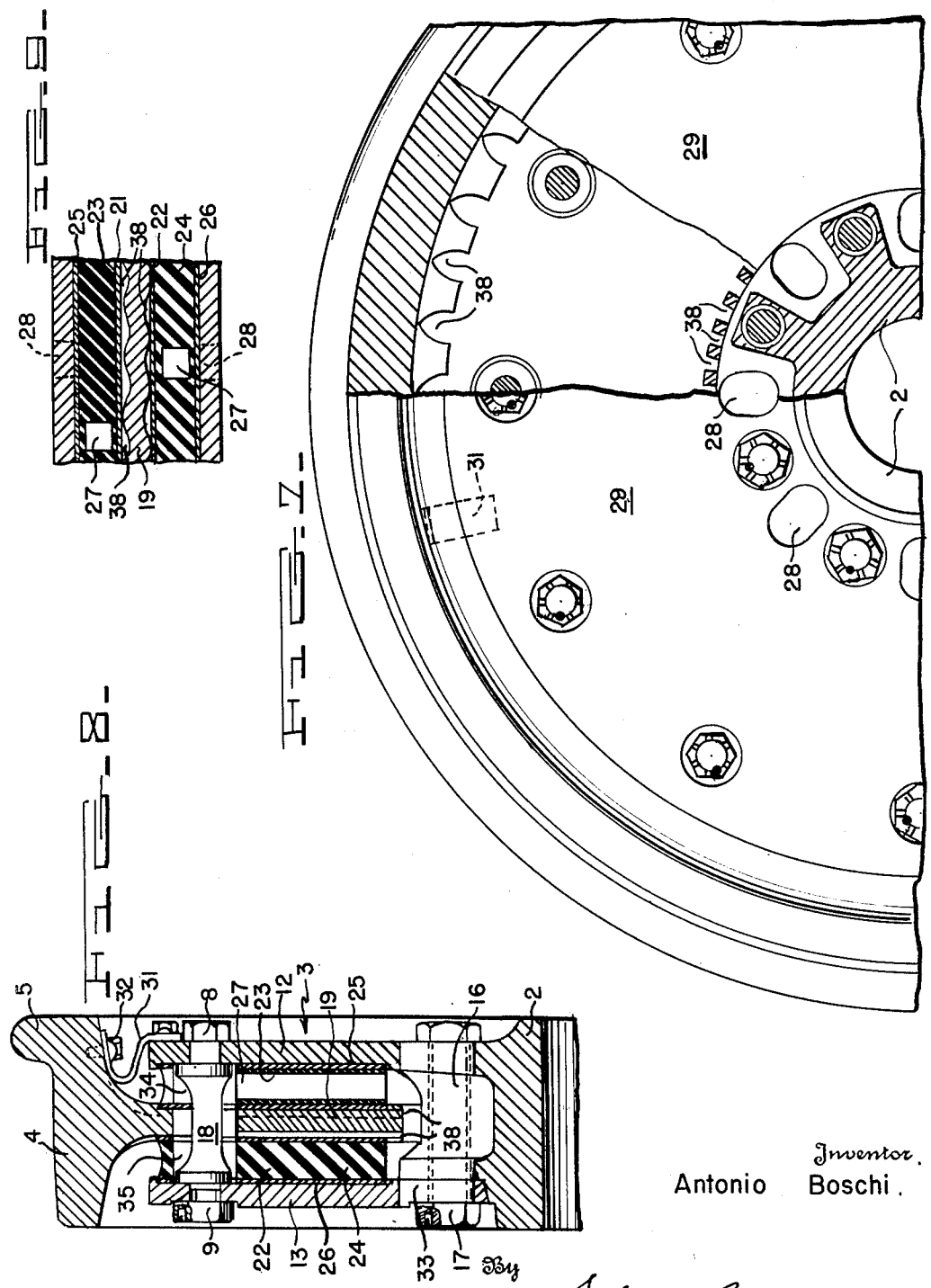

Patented June 23, 1953

2,643,153

UNITED STATES PATENT OFFICE 2,643,153

RESILIENT WHEEL

Antonio Boschi, Milan, Italy, assignor to Societa Applicazioni Gomma Antivibranti, Milan, Italy Application February 17, 1948, Serial No. 8,928
In Italy February 28, 1947

4 Claims. (Cl. 295—11)

This invention pertains to elastic wheels for vehicles and more particularly has reference to antivibration wheels for railroad and trainway cars on which the brakes are applied to the rims of the wheels.

In railroad and trainway wheels where rubber cushioning elements are inserted in the web of the wheel between the hub and rim, in order to reduce shock, vibration and noise in operation, difficulty has been encountered from the injurious effect on the rubber by the heat generated by the friction of the brakes on the rims. In order to protect the rubber parts of these wheels from such damage, it is essential to provide means for minimizing the flow of heat from the rims to the webs and for effectively dissipating the heat from the webs and parts of the wheel adjacent thereto, and particularly from the rubber elements.

In the prior art various expedients have been employed for this purpose, among which may be mentioned the use of heat-insulating materials between the metal and rubber parts of the wheel; reducing the areas of contact between the rubber and heated metal elements; and centrifugal aeration of the heated parts of the wheel by air currents generated in the rotation of the wheel by special more or less intricate ventilating channels constructed in the body of the wheel. While these various expedients have been helpful, they are difficult and expensive to apply and have not been altogether satisfactory in use.

An object of this invention is to secure better results than those obtained in the prior art, in a simpler and less expensive manner, by the novel constructions and arrangements hereinafter described which permit the elastic elements of a wheel and the rigid metal plates to which they are bonded to have almost their whole external surfaces exposed to direct contact with the circumambient air, whereby the maximum cooling of these parts is attained through direct radiation of heat to the air.

Another object of this invention is to reduce to a minimum the surface of contact between the rim and adjacent parts of a wheel, thereby reducing the amount of heat which can be transmitted by conduction from the rim to the rubber elements.

A further object of this invention is to devise means to proper centering of the rigid annular members of the assembled elastic web to the rim and hub of the wheel by coacting channels in the flange of the rim and hub.

Still another object of this invention is to provide in the rubber elements of an elastic wheel a number of grooves and holes whereby the rubber is cooled through radial aeration and may be subjected to a certain amount of axial precompression during mounting on the wheel, thereby assuring better connection among the various parts of the wheel and improvement in its transverse stability.

With these and other objects in view which may be incident to my improvements, my invention consists of the combination and arrangement of elements hereinafter described and illustrated in the accompanying drawings in which the same reference numerals refer to corresponding parts in the several figures and in which:

Figure 1 is a partial side elevation of an elastic wheel according to my invention in which a portion of the rim and hub is shown in longitudinal section, Figure 2 is a radial section of the wheel shown in Figure 1, Figure 3 is a fragmentary cross-section of the web of the wheel shown in Figure 1, on a plane parallel to the axis of rotation, Figure 4 is a view, similar to Figure 1, of a modified form of my invention, Figure 5 is a radial section of the wheel shown in Figure 4, Figure 6 is a fragmentary cross-section of the web of the wheel shown in Figure 3, on a plane parallel to the axis of rotation, Figure 7 is a view, similar to Figure 1, of another modification of my invention, Figure 8 is a radial section of the wheel shown in Figure 7, and Figure 9 is a fragmentary cross-section of the web of the wheel shown in Figure 7, on a plane parallel to the axis of rotation.

Referring to Figures 1, 2 and 3 of the drawings, the reference numeral 1 denotes the rim of a wheel, 2 the hub, and 3 the assembled web which connects the rim to the hub. The rim 1 has a tread 4 which contacts the upper face of the rail and an outwardly extending flange 5 which contacts the inner face of the rail. The brake shoe (not shown) for the wheel generally contacts the surface of tread 4, although by proper contouring, the shoe may also engage the inner face of flange 5 when the brake is applied. The rim 1 has two inwardly-projecting, rigid, circumferential flanges 6 which are provided with a number of spaced transverse holes 7 for the reception of bolts 8 with lock nuts 9, as clearly shown in Figure 2. The flanges 6 also have undercut channels 10 and 11 on their inner and outer faces respectively which serve for the reception of matching circular ribs on inner and outer rigid web members 12 and 13, so that when said members are assembled in position as shown in Figure 2, and the nuts 9 on the bolts 8 are tightened, the web members 12 and 13 are securely interlocked to the rim 1. Near their inner ends the web members 12 and 13 have a corresponding number of bolt holes 14 and 15 for the reception of bolts 16 with lock nuts 17 which, with spacer sleeves 18, serve to tie the web members 12 and 13 together in fixed spaced relation to each other.

Extending radially from the hub 2 is a rigid, integral annular flange 19 which is provided with a number of transverse holes 20 of such size as to permit free passage of the sleeves 18 through the flange 19 without any contact therebetween, as clearly shown in Figure 2. Each side face of the flange 19 has a circular groove for the reception of matching circular plates 21 and 22, each of which is bonded to an elastic (rubber) disc 23 and 24. Each disc 23 and 24 is in turn bonded to an outer circular plate 25 and 26 which fits into a matching circular groove in web members 12 and 13 respectively. When the nuts 17 are tightened on the bolts 16, the rubber discs 23 and 24 are squeezed into initial compression during assembly of the web 3 to the rim 1 and the hub 2. This compression is facilitated by a series of radial channels 27 which are provided in both rubber discs 23 and 24 at closely spaced intervals and which also serve to cool the rubber by centrifugal air flow therethrough when the wheel is in rotation. Radial channels 27 are spaced in each disc in staggered relation to each other so as not to coincide in any one radial plane, as indicated in Figures 2 and 3, thereby increasing their heat dissipating capacities.

To further facilitate the radiation of heat from the rubber discs 23 and 24, each web member 12 and 13 has a number of closely spaced radial cut-away portions or spaces 28, of such width as to leave therebetween an equal number of radial spokes 29 of generally elliptical cross-section, as shown in Figure 3. The rounded contour of the spokes 29 affords a minimum area of contact between each spoke and the adjacent plates 25 and 26, thereby reducing to a minimum the flow of heat from the rim through the web members 12 and 13 to the rubber discs 23 and 24. The cut-away portions 28 in each web member 12 and 13 are also staggered with relation to each other, so that each space 28 in the web member 12 falls opposite a spoke 29 in the web member 13, thereby increasing the lateral stability of the wheel.

It will be apparent from the foregoing description that the radial thrust from the hub 2 to the rim 1, and the tangential thrust from the rim 1 to the hub 2 will be transmitted through the web 3 by simple shear-flexion of the rubber discs 23 and 24 with respect to their bonded plates 21, 22, 25 and 26, since the inner plates 21 and 22 are firmly embedded in circular grooves in flange 19 and the outer plates 25 and 26 are similarly fixed to the web members 12 and 13, and since the flange 19 is integral with the hub 2 and the web members 12 and 13 are locked to the rim 1. Also, the holes 20 in the flange 19 are of such large size with reference to the sleeves 18 that there is no contact therebetween, even when the wheel is loaded, so that the only way in which a thrust from the rim 1 can reach the hub 2 and vice versa is through the rubber discs 23 and 24 and such thrust produces shear-flexion stresses in these discs.

The areas of contact between the rubber discs 23 and 24 which are bonded to the plates 21, 25, 22 and 26, are such as to elastically resist the full load radial thrust of the hub 2 on the rim 1, as well as the maximum tangential breaking thrust of the rim to the hub.

Furthermore the hereinbefore mentioned axial precompression of the rubber discs assures the lateral stability of the wheel. The channels 27 facilitate also said initial compression, reducing the maximum stress caused thereby, and permit great compression resistant to any tensional axial stress due to railway irregularity, curves, etc. At the same time all shocks and vibrations from the rim are absorbed by the rubber discs before they reach the hub, since there is no direct metal-to-metal connection between the rim and hub.

The proper centering of the web members 12 and 13 with respect to the rim 1 is secured by the interlocking connections between the annular projections around the outer edges of the web members 12 and 13 and co-acting channels in the flange 6 of the rim. This interlocking connection also prevents the rim and web members from having different radial and tangential expansions with changes in temperature, thereby preserving the rotational concentricity of the wheel.

In order to further reduce the flow of heat by conduction from the rim to the web members 12 and 13, the latter are provided near their peripheries with a series of cut-away notches 30 which reduces the area of contact between the rim and web members. The remaining intermediate portions of the peripheries between the notches may be considered in the nature of stub spokes adapted to engage the rim. To afford an electrical connection between the hub 2 and the rim 1, there is provided a flexible conductor 31 which is clamped between the head of the bolt 16 and the web member 12 at one end and attached at its other end to the hub 2 by a screw 32.

It will be apparent from the foregoing description that by means of cut-away areas 28 in both web members 12 and 13, the spaces left between both ends of the rubber discs 23 and 24, and the holes 20 in the flange 19, there is provision for the maximum exposure of the plates bonded to the rubber discs and the discs themselves to the surrounding air, thus insuring the maximum heat loss in the rubber discs 23 and 24 by direct radiation. These means of cooling the discs 23 and 24 have been augmented by providing the radial channels 27 in these discs, so as to insure air flow therethrough from centrifugal aeration during rotation of the wheel.

Referring to Figures 4, 5 and 6 of the drawings, it will be noted that the modifications shown in these figures differs from the form of wheel shown in Figures 1, 2 and 3 principally in the reversal of the arrangement of the inner and outer web members 12 and 13 and the central flange 19, with respect to the rim 1 and the hub 2. Here the inner web member 12 is integral with the hub 2 and the central flange 19 is integral with the rim 1. The outer web member 13 is bolted to an annular flange 33 on the hub 2 by means of inner bolts 16, while the web members 12 and 13 are tied together by the outer bolts 8 and the spacers 18 which pass through the holes 20 in the flange 19, and also through the holes 34 and 35 in the rubber discs 23 and 24. The cut-away portions 28 in the web members 12 and 13 of the wheel shown in Figures 4, 5 and 6 are much smaller and fewer in number than those in the wheel shown in Figures 1, 2 and 3, so that the intervening metal portions 29 in Figures 4, 5 and 6 are in the nature of circular segments, instead of rounded spokes as in Figures 1, 2 and 3. This construction of the web members 12 and 13 makes them better adapted to be fabricated from forged steel plates, with the cut-away portions 28 removed by milling, whereas in the wheel shown in Figures 1, 2 and 3, the web members 12 and 13 are most easily made by casting the metal in the form depicted.

In the form of wheel shown in Figures 4, 5 and 6, the inner plates 21 and 22, which are bonded to the inner faces of the rubber discs 23 and 24, are provided with a series of spaced circular grooves 36 interconnected by a number of radial grooves 37, as shown in Figure 4. These grooves reduce the area of metal-to-metal contact between the plates 21 and 22 and the central flange 19, and thus serve to diminish the amount of heat flowing by conduction from the rim 1 through the flange 19 to the rubber discs 23 and 24. Also the radial grooves 37 promote the centrifugal circulation of cooling air through the grooves 36 when the wheel is in rotation, thus affording additional means of keeping the rubber discs within permissible temperature limits at all times.

In the further modification of my invention illustrated in Figures 7, 8 and 9, the wheel is very similar in construction to that form shown in Figures 4, 5 and 6, the principal difference in these two forms being as follows. In the wheel depicted in Figures 7, 8 and 9, the cut-away portions 28 in the inner and outer web members 12 and 13 are reduced to very small holes 28 located near the hub 2, as shown in Figure 7. This leaves the web portion 29 of the members 12 and 13 as an almost solid circular plate which adds to the lateral strength of the wheel but reduces the area of the plates 25 and 26 exposed to the surrounding air and therefore the cooling effect on the rubber discs 23 and 24.

Also in the form of wheel shown in Figures 7, 8 and 9, there are no grooves in the inner plates 21 and 22, as in the form shown in Figures 4, 5 and 6, but in lieu thereof are provided radial grooves 38 in the central flange 19. These grooves are obtained by giving the central flange a wavy contour as shown in Figure 9 and the grooves 38 vary in width from a minimum near the hub to a maximum near the flange, as clearly illustrated in Figure 7. By this means a rapid circulation of cooling air is obtained through the grooves 38 by centrifugal force when the wheel is in rotation.

A comparison of the three forms of wheel illustrated in the drawings shows that the wheel depicted in Figures 1, 2 and 3 affords the largest cooling effect on the rubber discs from circumambient air and the least lateral strength, and the wheel shown in Figures 7, 8 and 9 affords the least cooling effect on the rubber discs but maximum strength of wheel, while the form shown in Figures 4, 5 and 6 is intermediate between the other two in both of these respects.

While I have shown and described the preferred forms of my invention, I desire it to be understood that I do not limit myself to the constructional details disclosed by way of illustration, as it is apparent that these may be changed and modified by those skilled in the art without departing from the spirit of my invention or exceeding the scope of the appended claims.

I claim:

1. An elastic wheel having a rigid hub and rim and a resilient web connecting said hub and rim, said web comprising a plurality of rigid annular members radially attached alternately to said hub and rim, and an elastic disc interposed between each adjacent pair of said rigid members and adapted to transmit thrust from said hub to said rim by shear-flexion stress, the outer rigid annular members having relatively large cut away portions axially opposite the side faces of the next adjacent elastic disc, thus exposing substantial areas of said discs to the surrounding air, and defining radial spokes in said outer annular members which, upon rotation of the wheel, serve as fan blades to increase the circulation of said air across said exposed areas, and thereby increase the radiation of heat from said elastic discs.

2. A wheel according to claim 1, in which cutaway notches are provided in the outer peripheries of said outer members to reduce the conduction of heat from said rim to said outer members.

3. A wheel according to claim 1, in which said notches are of such relatively large size that the walls of said rigid outer members between said notches constitutes stub spokes, the outer ends of which engage said rim.

4. An elastic wheel having a rigid hub and rim and a resilient web member connecting said hub and rim, said web member comprising a plurality of rigid annular members radially attached alternately to said hub and rim, and an elastic disc interposed between each adjacent pair of said rigid members and adapted to transmit thrust from said hub to said rim by shear-flexion stress, the outer rigid annular members having, in locations opposite the side faces of the next adjacent elastic disc, relatively large openings, with their lengthwise dimensions extending radially so that the wall of each said outer rigid annular member between adjacent openings constitutes radial spokes.

ANTONIO BOSCHI.

References Cited in the file of this patent

UNITED STATES PATENTS

| Number | Name | Date |
| --- | --- | --- |
| 1,122,620 | Madden | Dec. 29, 1914 |
| 2,244,633 | Saurer | June 3, 1941 |
| 2,278,711 | Piron | Apr. 7, 1942 |
| 2,294,818 | Williams | Sept. 1, 1942 |
| 2,295,269 | Piron | Sept. 8, 1942 |
| 2,295,270 | Piron | Sept 8, 1942 |
| 2,310,486 | Zintsmater | Feb. 9, 1943 |

FOREIGN PATENTS

| Number | Country | Date |
| --- | --- | --- |
| 390,953 | Great Britain | Apr. 20, 1933 |